(No Model.) 2 Sheets—Sheet 1.
E. J. LAHAN.
RUNNING GEAR FOR VEHICLES.
No. 564,088. Patented July 14, 1896.
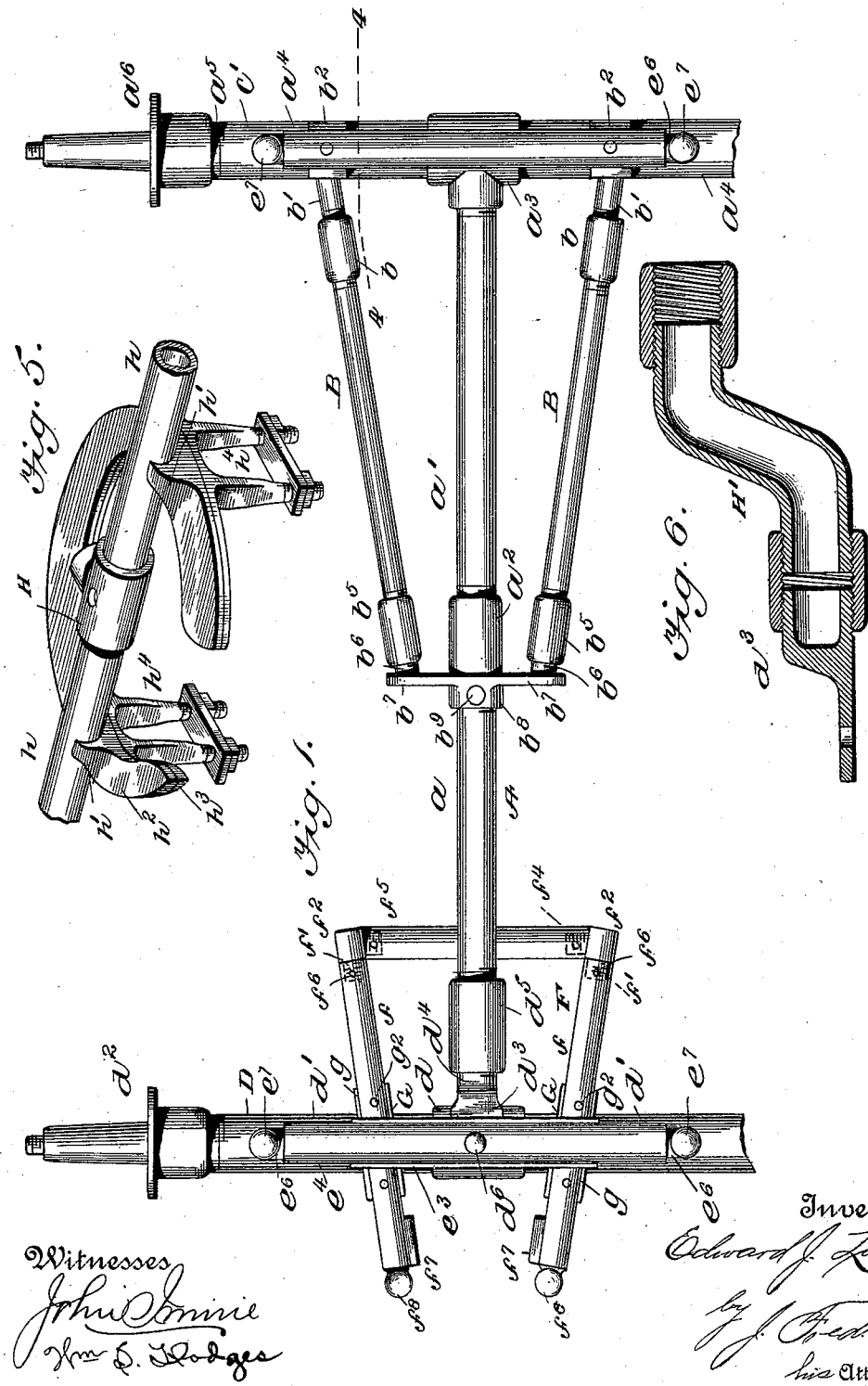
Witnesses
Inventor
Edward J. Lahan,
his Attorney.

(No Model.) 2 Sheets—Sheet 2.
E. J. LAHAN.
RUNNING GEAR FOR VEHICLES.
No. 564,088. Patented July 14, 1896.
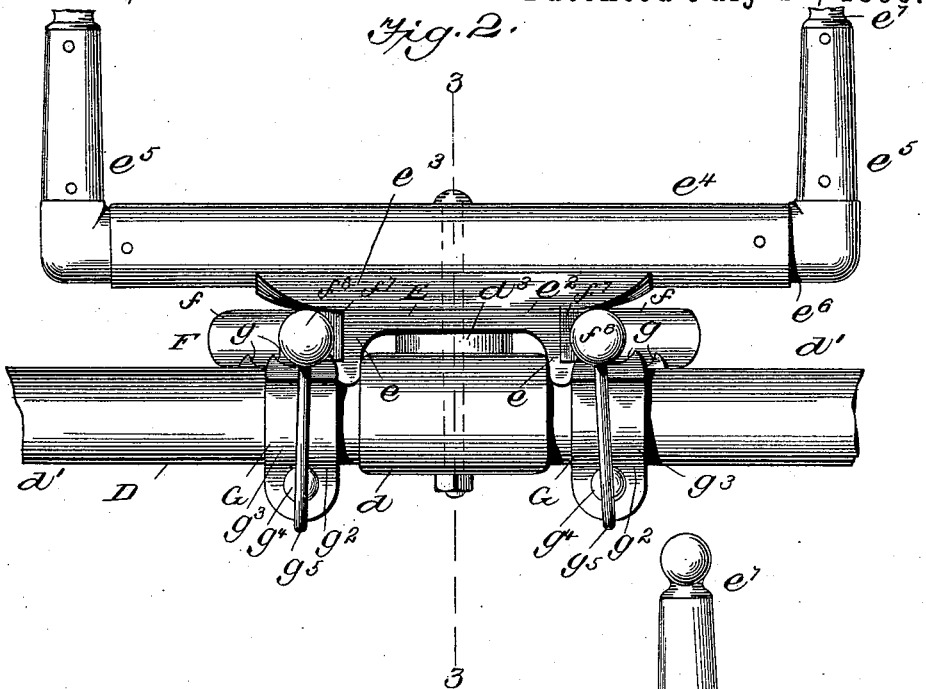
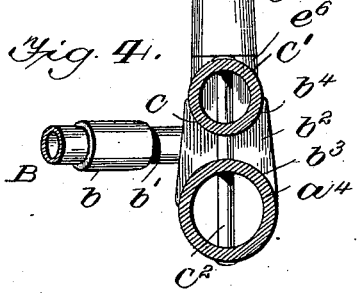
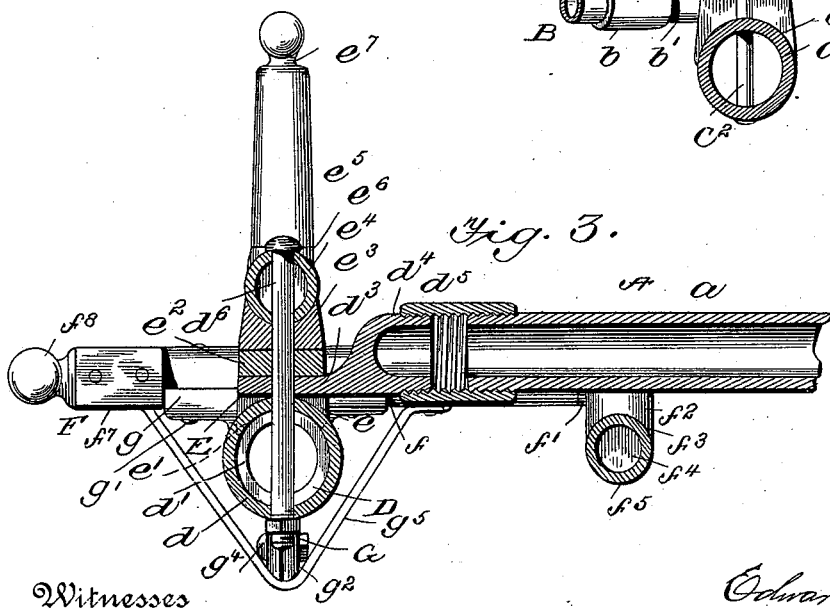
Witnesses
John Jumie
Wm. S. Hodges
Inventor
Edward J. Lahan,
by J. Fred. L. Reily,
his Attorney.

UNITED STATES PATENT OFFICE.

EDWARD J. LAHAN, OF QUINCY, ILLINOIS.

RUNNING-GEAR FOR VEHICLES.

SPECIFICATION forming part of Letters Patent No. 564,088, dated July 14, 1896.

Application filed December 11, 1895. Serial No. 571,785. (No model.)

*To all whom it may concern:*

Be it known that I, EDWARD J. LAHAN, a citizen of the United States, residing at Quincy, in the county of Adams and State of Illinois, have invented certain new and useful Improvements in Running-Gear for Vehicles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention contemplates certain new and useful improvements in running-gear for wagons and the like.

The invention has for its object the production of a running-gear for wagons and other similar vehicles, made up of threaded pipes or tubular sections which can be readily and easily put together and which will form a rigid and firm support for the wagon-body.

A further object is to make an improved running-gear for wagons which shall be simple in construction, strong, and durable.

The invention will be hereinafter fully set forth, and particularly pointed out in the claims.

In the accompanying drawings, Figure 1 is a plan view. Fig. 2 is a front elevation. Fig. 3 is a cross-sectional view on the line 3 3, Fig. 2. Fig. 4 is a similar view on the line 4 4, Fig. 1. Figs. 5 and 6 are views of modifications.

Referring to the drawings, A designates the reach, which consists of two tubular sections $a\ a'$, united at their inner ends by a threaded coupling $a^2$. A T-coupling $a^3$ is secured to the rear threaded end of section $a'$, and in its two threaded branches are secured tubular members $a^4$, forming the rear axle of the vehicle. The outer ends $a^5$ of members $a^4$ are screw-threaded for the purpose of attaching suitable spindles $a^6$ for the wheels. (Not shown.)

B B designate the brace-rods for the rear axle. Said rods are connected at their rear ends by means of threaded couplings $b$ to suitable studs or projections $b'$ of blocks $b^2$, which latter are provided with double concaved faces $b^3\ b^4$, the former being adapted to rest upon the tubular sections $a^4$, forming the rear axle. The concaved surfaces $b^4$ of blocks $b^2$ are adapted to receive the tubular base C of the rear bolster C', the latter being rigidly held in place by means of rods or bolts $C^2$, passed therethrough and through sections $a^4$. At their forward ends the brace-rods B are united by couplings $b^5$ to threaded studs $b^6$, projecting from wings $b^7$, formed with a collar $b^8$, rigidly secured to the reach A by means of a nutted bolt $b^9$. By means of the threaded couplings $b$ and $b^5$ the brace-rods B may be firmly united to the other parts, making this portion of the running-gear perfectly rigid and strong.

D designates the front axle, which comprises a central threaded coupling $d$, to which are united two tubular members $d'$, to the outer ends of which are secured wheel-spindles $d^2$, similar in every respect to spindles $a^6$. The reach is united to the front axle by means of a flattened member $d^3$, provided with a rear threaded extension $d^4$, which is united by means of a coupling $d^5$ to the forward end of section $a$, the flattened member $d^3$ being adapted to rest on said axle and provided with a suitable hole or opening for the passage of the king-bolt $d^6$.

E is a bracket or support which, with member $d^3$, is adapted to form the fifth-wheel for the vehicle. This bracket or support comprises two vertical members $e$, having concaved lower edges $e'$ adapted to rest on axle D, said upright members being united by an upper flattened or horizontal portion $e^2$, adapted to form a rest for the support $e^3$ of the front bolster $e^4$. The king-bolt $d^6$ is passed through axle D, member $d^3$, bracket E, and the front bolster and its support, thereby forming a pivotal connection between the front and rear portions of the vehicle. The front and rear bolsters are each provided with the usual standards $e^5$, united thereto by threaded elbow-couplings $e^6$ and having screw-plugs $e^7$ in their upper ends.

The hounds F are made up of two longitudinal tubular members $f$, to the rear end of each of which is connected a threaded stud $f'$ of angular members $f^2$, having depending portions $f^3$. From the inner faces of these depending portions project threaded studs $f^4$, which are adapted to engage the ends of a tubular section $f^5$, whereby the longitudinal portions $f$ are held in juxtaposition to each other. Keys or bolts $f^6$ are also passed through sections $f$ and studs $f'$ and the section $f^5$ and studs $f^4$. Blocks $f^7$ are secured to the inner portions of the forward ends of longitudinal portions $f$, and screw-plugs $f^8$ are secured in the open ends of the latter.

The hounds are secured to the axle D by means of brackets G, which are provided with upper concaved portions or faces $g$, upon which the longitudinal members $f$ are adapted to rest and to which they are secured by bolts $g'$. The brackets G are provided with depending portions $g^2$, which are bulged at $g^3$ to receive axle D and are united at their lower ends by nutted bolts $g^4$. Brace-rods $g^5$ are secured to the under sides of members $f$ and passed beneath the depending portions $g^2$ of brackets G.

In Fig. 5 I have shown a modified form of the fifth-wheel, which consists of a T-coupling H, which is united to the forward end of the reach A and is provided with two sections or members $h$, designed to form a rest for the body of the wagon or other vehicle. The sections or members $h$ rest in brackets or struck-up portions $h'$ of a flat circular plate $h^2$, which is adapted to rest on a similar plate $h^3$, secured by clips $h^4$ to the front axle D. The king-bolt $d^6$ passes through axle D and coupling H.

In Fig. 6 I have shown a modified form of member $d^3$, adapted for use in vehicles having low front wheels. In this form an angular member H' is secured by suitable couplings to the reach and to the forward axle.

From what has been said it will be seen that I have produced a running-gear for heavy wagons which is simple in construction, strong, and durable, and which will not readily suffer from the heavy strains usually imposed upon vehicles of this character.

I claim as my invention—

1. The herein-described improved running-gear for vehicles, comprising a reach formed of two or more tubular sections rigidly secured together, a rear axle also formed of tubular sections rigidly secured to said reach, double concave blocks secured thereto and adapted to support a tubular bolster, a front axle also formed of tubular sections and pivotally connected to said reach, and threaded wheel-spindles secured to the outer ends of said axles, substantially as set forth.

2. The herein-described improved running-gear for vehicles, comprising a reach formed of tubular sections, a rear axle also formed of tubular sections and rigidly connected to said reach, bolster-blocks rigidly secured thereto, studs projecting from said blocks, a collar rigidly secured to said reach and having lateral wings, threaded studs projecting therefrom, tubular brace-rods connecting the threaded studs of said blocks and said wings, and a front axle also formed of tubular sections and pivotally connected to said reach, substantially as set forth.

3. The herein-described improved running-gear for vehicles, comprising a reach formed of tubular sections, a rear axle also formed of tubular sections and rigidly connected to said reach, blocks secured to said rear axle, and provided with lower concaved faces adapted to fit around said axle and upper concaved faces adapted to support a tubular bolster, a collar rigidly secured to said reach and provided with lateral wings, tubular brace-rods connected to said blocks and said wings, and a front axle also formed of tubular sections and pivotally connected to said reach, substantially as set forth.

4. The herein-described improved running-gear for vehicles, comprising a reach formed of tubular sections, a rear axle also formed of tubular sections and rigidly connected to said reach, blocks secured to said rear axle and having concaved faces threaded studs projecting therefrom, a collar encircling said reach and provided with lateral wings, a rod or bolt for securing said collar in position, threaded studs projecting from said wings, tubular brace-rods, couplings for uniting said brace-rods to said studs, and a front axle also formed of tubular sections and pivotally connected to said reach, substantially as set forth.

5. The herein-described improved running-gear for vehicles, comprising the tubular reach, a tubular rear axle rigidly secured thereto, blocks secured to said rear axle and provided with upper and lower concaved faces, a rear bolster adapted to fit in the upper concaved faces of said blocks, brace-rods connecting said blocks and said reach, a front axle pivotally connected to said reach, and a front bolster carried thereby, substantially as set forth.

6. The herein-described improved running-gear for vehicles, comprising a tubular reach, a tubular rear axle rigidly secured thereto, blocks secured to said rear axle and provided with upper and lower concaved faces, a tubular rear bolster adapted to fit in the upper concaved faces of said blocks, brace-rods connecting said blocks and said reach, a front axle pivotally connected to said reach, a tubular front bolster carried by said front axle, and tubular standards united to said bolsters, substantially as set forth.

7. The herein-described improved running-gear for vehicles, comprising a tubular reach, a tubular rear axle rigidly secured thereto at its rear end, a tubular front axle, a flattened member secured to the forward end of said reach and pivotally connected to said front axle, and a bracket or support secured on said front axle and extended over said flattened member and adapted to bear thereon, said bracket being designed to support the front bolster, substantially as set forth.

8. The herein-described improved running-gear for vehicles, comprising a tubular reach, a tubular rear axle rigidly secured thereto at its rear end, a tubular front axle, a bracket or support having depending end portions resting upon said forward axle and a flat connecting portion adapted to bear on said flattened member, and a concaved plate resting on said bracket or support and adapted to support a front bolster, substantially as set forth.

9. The herein-described improved running-gear for vehicles, comprising a tubular reach, a tubular rear axle rigidly secured thereto at its rear end, a tubular forward axle, two-part brackets secured to said forward axle, tubular hounds supported by said brackets, and means for pivotally connecting said reach and said forward axle, substantially as set forth.

10. The herein-described improved running-gear for vehicles, comprising a tubular reach, a tubular rear axle rigidly secured thereto at its rear end, a tubular forward axle, two-part brackets secured to said forward axle and having upper concaved wings, tubular hounds adapted to rest on said wings, and means for pivotally connecting said reach and said forward axle, substantially as set forth.

11. The herein-described improved running-gear for vehicles, comprising a tubular reach, a tubular rear axle rigidly secured thereto at its rear end, a tubular forward axle, two-part brackets secured to said forward axle, hounds having longitudinal tubular portions secured to said brackets, a rear tubular connecting portion for said longitudinal portions, and means for pivotally connecting said reach and said forward axle, substantially as set forth.

12. The herein-described improved running-gear for vehicles, comprising a tubular reach, a tubular rear axle rigidly secured thereto at its rear end, a tubular forward axle, hounds having longitudinal tubular portions secured to said front axle, a rear tubular portion, and depending angular members uniting said tubular portions of said hounds, and means for pivotally connecting said reach to said forward axle, substantially as set forth.

13. The herein-described improved running-gear for vehicles, comprising a tubular reach, a tubular rear axle rigidly secured to the rear end thereof, a tubular forward axle, hounds having longitudinal tubular portions secured to said forward axle, a rear tubular portion, and depending angular members having lugs adapted to enter the open ends of said tubular portions and unite the same, and means for pivotally connecting said reach to said forward axle, substantially as set forth.

In testimony whereof I affix my signature in presence of two witnesses.

EDWARD J. LAHAN.

Witnesses:
J. O. BURLINGAME,
CHRIS. WEBER.